July 24, 1951 M. LADGE 2,561,517

DISPENSING CABINET

Filed Dec. 26, 1946

INVENTOR.
MORRIS LADGE
BY
ATTORNEY

Patented July 24, 1951

2,561,517

UNITED STATES PATENT OFFICE 2,561,517

DISPENSING CABINET

Morris Ladge, Newton Center, Mass.

Application December 26, 1946, Serial No. 718,512

1 Claim. (Cl. 126—273)

The present invention relates to a device for maintaining food stuffs, particularly breads, cakes, and pastries, at a desired temperature. In restaurants and food shops, it is often desirable to maintain articles such as rolls and pies warm and in edible condition for a considerable period of time so that the food may be served immediately upon order without the necessity of preparation.

In order to have such foods, particularly things like hot rolls, in the proper state to satisfy the patron, not only must such items be kept warm or hot, but care must also be taken that the foodstuff does not lose its moisture due to the continued application of heat.

The arrangement in the present invention is such that the desired conditions above set forth are maintained and the food may be served at any time at its very best. This is accomplished in the present invention by employing a cabinet in which the temperature is maintained by warmed air, which is recirculated within the cabinet in such a way that no air is permitted to escape. Under these conditions, the air itself will have a certain amount of moisture which must be maintained in order that the articles, to be preserved or maintained in their best state, will not dry out.

If the preservation of the best state of the food stuff requires that the air become moisture saturated at the desired temperature, this may be obtained by including in the cabinet a sponge area filled with water over which the warm air passes as it circulates through the system. In many cases, however, the air will acquire sufficient moisture so that the foodstuff will be maintained in its proper condition. This is possible in the present invention because very little air is permitted to escape, and therefore the air within the cabinet never really becomes dry.

A further adaptation of the present invention is to provide individual chambers in the cabinet which are separately sealed and through which no circulating air from the cabinet passes. The food is put into these chambers from an outside opening so that in effect the circulation in the chambers is entirely in and around the food stored in it.

Other and further advantages of the present invention will be more readily understood from the observations set forth below when taken in connection with the drawings illustrating an embodiment of the invention, in which Fig. 1 shows a sectional elevation through the invention on the line 1—1 of Fig. 2;

Figure 3:
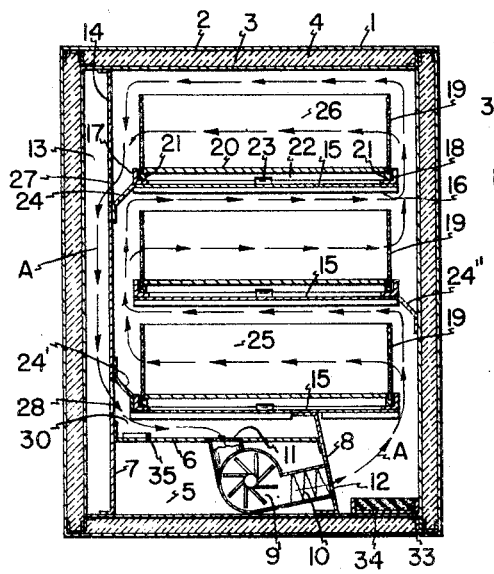
Fig. 3 shows a modification of the invention set forth in Fig. 1 taken as a sectional elevation on the line 3—3 of Fig. 4.
Figure 4:
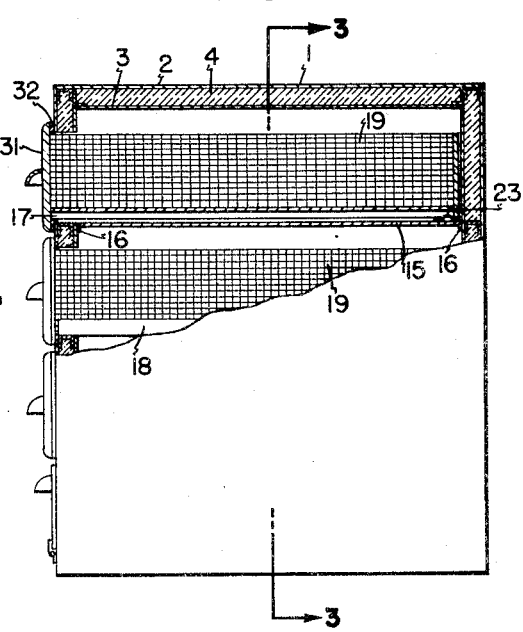
Fig. 4 shows a side elevation of the modification of Fig. 3 with portions in fragmentary sections.

In the arrangement indicated in Figs. 3 and 4, there is shown a cabinet 1 which may be formed of an outer wall 2 and an inner wall 3 between which suitable heat insulating material 4 may be placed. At the base of the cabinet a chamber 5 is formed by means of the horizontal wall 6 and two side walls 7 and 8. The inside end walls of the casing may serve to close the other ends of the chamber. Within this chamber there is positioned a blower 9 with a heating element 10 in the outlet of the blower. The inlet of the blower may be in the horizontal wall 6 as indicated at 11 and the outlet in the side wall 8 as indicated at 12. The purpose of the blower and heating unit is to recirculate the air at the desired temperature. At one side (in the left of Fig. 3) there is an upwardly extending passage 13 formed by the extension 14 of the wall 7. This runs continuously up to the top of the cabinet and preferably is parallel to the inside adjacent wall. Extending transversely across from the wall 14 are supporting platforms or brackets which comprise baffles or plates 15 welded by means of downwardly extending flanges 16 to the side walls. These plates 15 at their sides may be provided with angle brackets 17 and 18, forming guideways for the drawers 19, which preferably have porous or gridlike walls as indicated in Fig. 4. These drawers 19 are provided with a stiff base 20, which may be of metal with downwardly extending flanges 21 positioned within the angles 17 and 18, and a back flange 22 which snaps over the arcuate spring leaf 23 mounted on the plates 15 at the back of the cabinet. As indicated more clearly in Fig. 3, there is a baffle or plate 24 extending from the plates 15 across to the side walls. The plate 24 is sloped downward from the plate 15 and extends to the wall 14, which is the outer wall of the chamber 13. The lower baffle or plate 15 has the baffle or wall 24' extending upward to the wall 14, while the middle plate 15 is connected to the side wall 3 by the downwardly extending plate 24''.

The path of circulation of the air or gas within the chamber is shown by the series of arrows. Commencing at the outlet 12, the arrow A follows upward on the right of the cabinet (Fig. 3) through and across the lower drawer 25 between the lower and middle plates 15 then upward on the left of the cabinet along the right side of the wall 14 and then between the middle and upper plates 15 across to the right of the cabinet. The direction of flow continues above the upper plate 15 through and across the top drawer 26 and then downward on the left side of the cabinet as seen in Fig. 3. The wall 14 is perforated at 27 and this, together with the plate or baffle 24, causes the air to pass downward in the passage 13 through the lower perforation 28 in the wall 14 whereupon the air is sent through the passage 30 between the lower plate 15 and the wall 6 and through the opening 11. The baffle 24' serves to partition or cut off the air passing through the opening 28 from entering the upper compartment until it first has passed through the blower and heater.

The drawers have large end flanges 31 with sealing gaskets 32 under the edge flanges between the outer wall of the cabinet and the large end flanges of the drawers. When the drawers are pushed or snapped in place by means of the end flange 22 of the drawer passing over the spring latch 23, the flange 31 presses the gasket 32 closely against the outer side walls so that in this position the drawers are well sealed and little air escapes from the cabinet. The circulating system is well baffled and the air or gas within the cabinet proceeds in one continuous path so that the flow over all is equal and each portion of the cabinet is therefore treated substantially in the same manner.

It has been found that by providing a certain amount of moisture initially in the cabinet at a certain temperature, this moisture under ordinary conditions will substantially be maintained unless there is a tendency for absorption because the contents within the cabinet are drier than the air. Ordinarily, the percentage of the moisture is therefore made to correspond to the condition of the material to be kept warm. A source of moisture, as for instance a sponge 33, is positioned in the chamber or vessel 34 at the bottom of the cabinet, preferably in the vicinity of the outgoing air from the opening 12. A thermostat 35 may be placed within the cabinet and this, by well known external means not shown, may control the operation of the heating coil to maintain a desired temperature.

Figure 1:
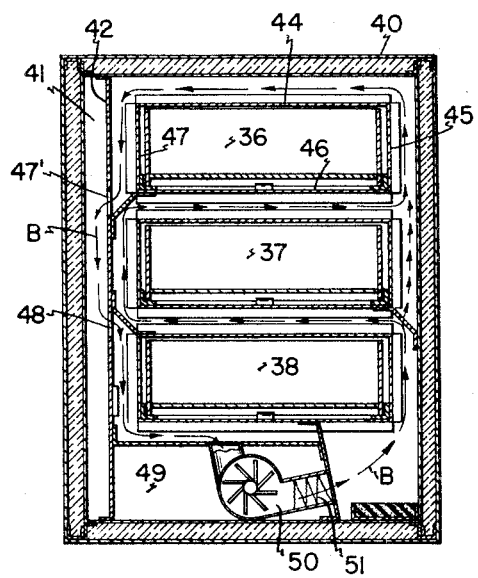
Figure 2:
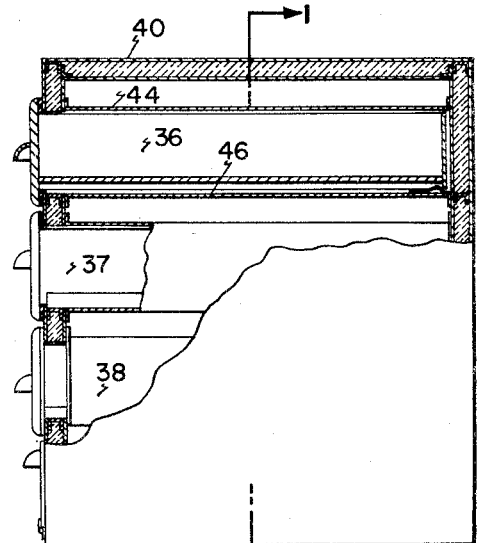
Fig. 2 shows a side elevation of the invention with fragmentary portions broken away.

In the modification illustrated in Figs. 1 and 2, the cabinet 40 is provided with a similar circulatory system as shown in Figs. 3 and 4. Here a side passage 41 is formed by the inner wall of the upwardly extending partition 42 to receive the down draft air as indicated by the arrow B. In Figs. 1 and 2, however, the drawers 36, 37, and 38 are surrounded on the ends and all four sides by walls 44, 45, 46, and 47 in such a manner that the space in which the drawers 36, 37, and 38 slide is entirely sealed from the circulatory air within the chamber. In this way, one of the drawers may be removed without changing the air in the chamber, although the removal of the drawers will change the effect of the heat transfer and compel a greater amount of heat to be provided for maintenance of the desired temperature.

In the arrangement shown in Figs. 1 and 2, the circulating air represented by the arrow B travels upward to the right of the cabinet as viewed in Fig. 1, across the cabinet between the walls surrounding the drawers 37 and 38, then upward and crisscross around the walls surrounding the drawers until the circulatory air is finally driven through the perforation 47' into the passage 41 and out through the perforation 48 between the wall 42 and the wall surrounding the drawer 38.

Otherwise, the arrangement in Fig. 1 is similar to that in Fig. 3. The chamber 49 corresponds to the chamber 5 and the blower 50 to the blower 9, while the heating coil 51 corresponds to the heating coil 10.

The cabinet of the present invention is particularly useful for warming or keeping warm rolls, biscuits, bread, pastries, or the like, and in either form shown may be used without substantially changing the characteristics of the food stuffs which are kept warm.

These cabinets are remarkably economical because only a small heating unit is necessary to maintain the desired temperature since the heat convection through the walls of the cabinet is small and the heated air circulation within the cabinet is constantly in operation to maintain a uniform temperature throughout the cabinet.

Having now described my invention, I claim:

A completely enclosed cabinet having air or gas circulating medium for warming food products comprising a casing having drawer openings in the front thereof and having means forming a plurality of transverse baffles extending alternately first to one side wall and then to the other side wall of the casing, said baffles having angle pieces at the sides thereof extending backwards from the drawer openings and forming drawer supports, a plurality of drawers having front sections adapted to fit said openings and adapted to slide in said supports and to be withdrawn through said openings at the front of the casing, means forming a passageway at one side of the casing to complete a return path for the circulating gases or air having an inlet just above the top baffle, below the position of the top drawer and an outlet just below the lower baffle adjacent the position of the lowest drawer, a chamber formed at the bottom of the casing, means providing a communicating passage from said outlet around the bottom of said last drawer to said chamber through which the circulating gases or air must pass, and blower and heater means situated therein to maintain the circulation of such air or gases.

MORRIS LADGE.

REFERENCES CITED

The following references are of record in the file of this patent:

UNITED STATES PATENTS

| Number | Name | Date |
|---|---|---|
| 111,467 | Miller | Jan. 31, 1871 |
| 288,201 | Blodgett | Nov. 13, 1883 |
| 385,919 | Day | July 10, 1888 |
| 417,698 | Atkinson | Dec. 24, 1889 |
| 628,322 | Hoffmire | July 4, 1899 |
| 651,786 | Turner | June 12, 1900 |
| 957,748 | Coppridge | May 10, 1910 |
| 975,107 | Ayer et al. | Nov. 8, 1910 |
| 1,069,376 | Bell | Aug. 5, 1913 |
| 1,218,341 | Truitt | Mar. 6, 1917 |
| 1,287,899 | Crowe | Dec. 17, 1918 |
| 1,353,358 | Steenfeldt-Lindholm | Sept. 21, 1920 |
| 1,535,465 | Hackman | Apr. 28, 1925 |
| 1,564,783 | Harris | Dec. 8, 1925 |
| 1,893,694 | Bohmker | Jan. 10, 1933 |
| 2,060,065 | Gill et al. | Nov. 10, 1936 |
| 2,179,327 | Evans | Nov. 7, 1939 |
| 2,412,103 | Spooner | Dec. 3, 1946 |